United States Patent [19]

Sheppard

[11] 3,970,166
[45] July 20, 1976

[54] AXLE MOUNTING OF INTEGRAL POWER STEERING GEAR

[76] Inventor: Richard H. Sheppard, c/o R. H. Sheppard Co., Inc., Hanover, Pa. 17331

[22] Filed: Jan. 23, 1975

[21] Appl. No.: 543,631

[52] U.S. Cl. .................................. 180/163; 267/52; 280/669
[51] Int. Cl.² .......................................... B62D 5/06
[58] Field of Search ........... 180/79.2 R; 280/96.2 R; 267/52, 48; 248/19, 23

[56] References Cited
UNITED STATES PATENTS

| | | | |
|---|---|---|---|
| 1,593,744 | 7/1926 | Benning | 248/23 |
| 1,687,720 | 10/1928 | Garner | 180/79.2 R |
| 1,777,109 | 9/1930 | Stokes et al. | 180/79.2 R |
| 1,804,446 | 5/1931 | Stokes et al. | 180/79.2 R |
| 2,152,021 | 3/1939 | Baumer | 180/79.2 R |
| 2,369,644 | 2/1945 | Berry et al. | 280/96.2 R |
| 2,896,463 | 7/1959 | Rockwell | 180/79.2 RX |

*Primary Examiner*—M. H. Wood, Jr.
*Assistant Examiner*—John A. Pekar
*Attorney, Agent, or Firm*—Lowe, King, Price & Markva

[57] ABSTRACT

A bracket is provided for mounting an integral power steering unit on the axle of a vehicle wherein the forces of reaction of the unit are accommodated. The bracket is provided with a base mounting plate having at least one locating pin cooperating with the pad on the axle for mounting of the spring. The pin has a locational interference fit with the apertures in both the plate and the pad. U-bolts clamp together the plate, the pad and the spring of the vehicle. Locking means is provided to positively resist pivoting of the mounting bracket about the pin under the powerful reaction forces of the power steering gear unit. Preferably, this locking means takes the form of four spaced set screws mounted on depending skirts at the front and rear of the mounting plate at the spring mounting pad. In an alternative embodiment, this locking means may take the form of one or more additional interference fitting pins extending through the bracket and the mounting pad. The additional pins are provided as may be necessary for the particular vehicle in accordance with the steering force requirements. In the preferred embodiment, all that need be done to adapt the standard axle to the new mounting system is reaming of the existing locating aperture for a larger locating pin, whereby the required interference fit may be effected. The set screws are individually adjusted and engage the front and rear edges of the spring pad on the axle without the need for additional machining.

14 Claims, 7 Drawing Figures

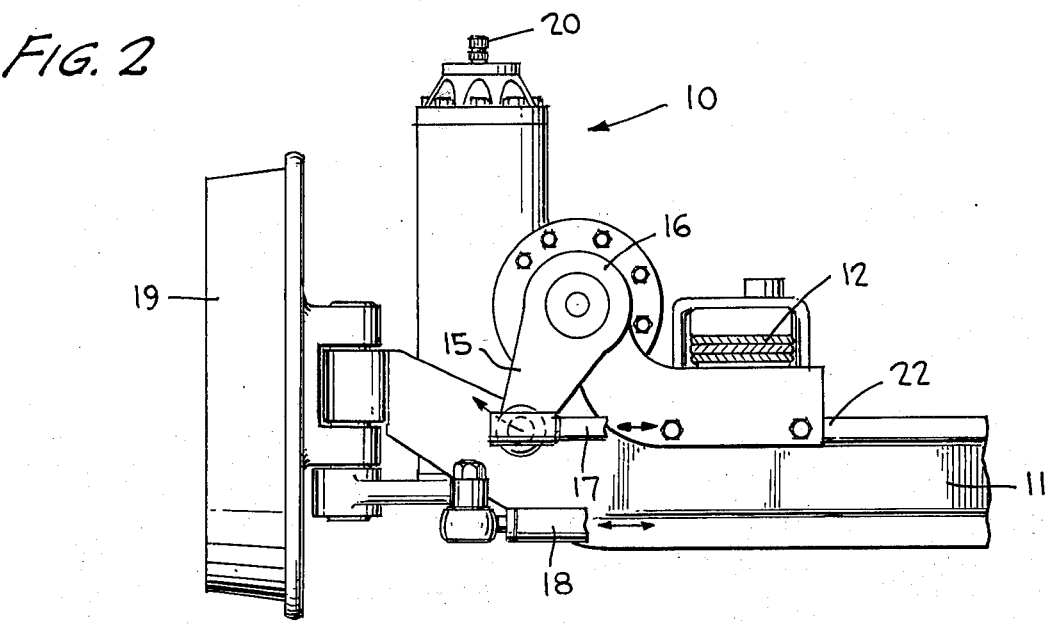
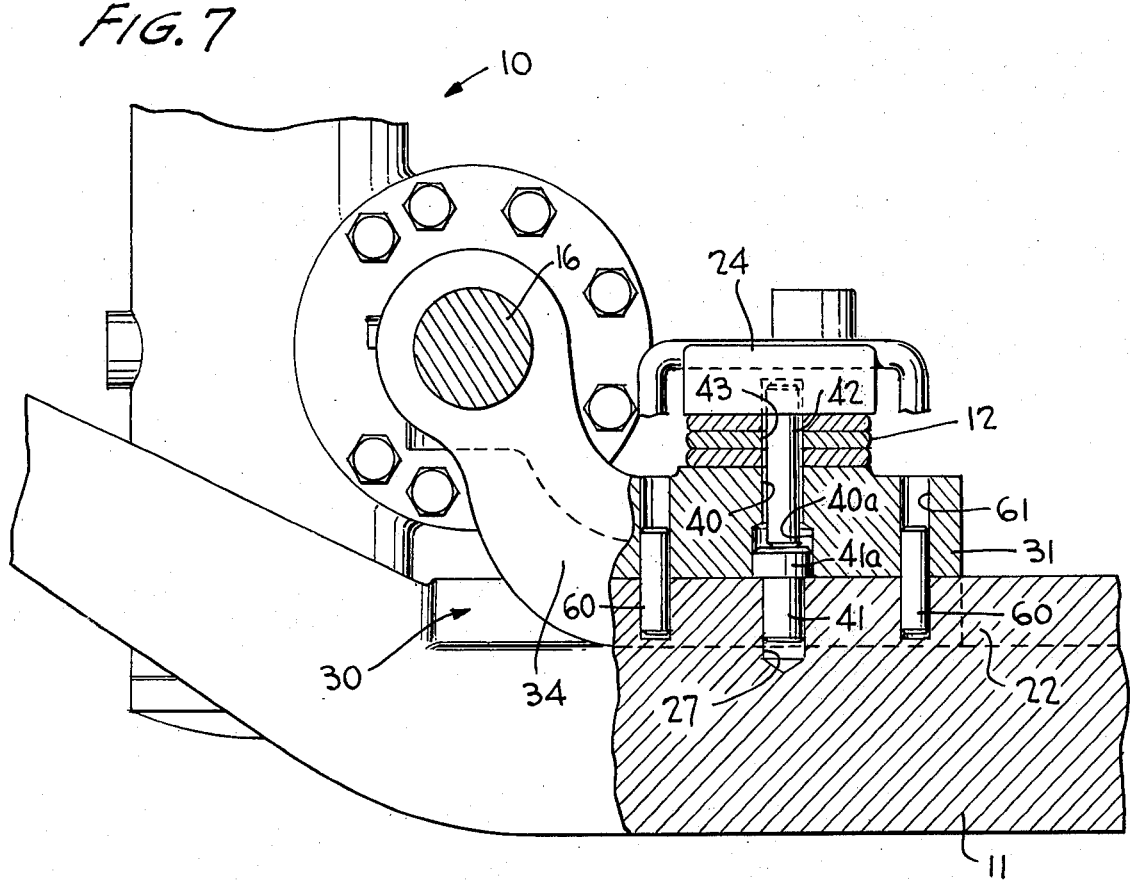

AXLE MOUNTING OF INTEGRAL POWER STEERING GEAR

FIELD OF THE INVENTION

The present invention relates to power steering, and more particularly, to a mounting arrangement for a power steering gear unit on the axle of the vehicle.

BACKGROUND OF THE INVENTION

It has been known for some time that it would be of advantage to mount a power steering unit on the axle of a vehicle, especially on large trucks with a one-piece front axle. So mounted, the associated steering linkages and rods do not move up and down relative to the power steering unit as the vehicle is driven, as occurs in trucks with frame steering gears. That is, with an axle mount gear unit, as the wheels of the vehicle and the supporting axle move to negotiate bumps in the road, the power steering unit moves also. There is thus eliminated the constant change in the angle of the drag link connected to the crank of the power steering unit that would otherwise occur with each up and down movement of the wheels, and of course that would occur also due to different loading on the springs of the vehicle.

As the need, and the desirability, of using dual power steering units on a truck or similar vehicle has arrived, it has become even more desirable to develop the axle mount. This is so, since while the need to avoid changes in the geometry of the steering linkage is important in a single unit installation, it is of paramount importance in a dual system. Each change in geometry in a dual system where the units are frame mounted introduces a force mismatch causing "fighting". This lowers steering efficiency and has the potential of causing steering "chatter".

Another factor pointing toward development of a successful axle mount, is that recently there has been developed a reliable extensible and flexible connection for connecting the steering shaft of the vehicle to the input shaft of the power steering unit. This extensible and flexible connection absorbs the road shock that previously had to be accommodated in the movement of the steering drag link, and does so without adversely affecting the operation of the steering system. Finally, the technology of building steering gears has developed to the point where the steering unit is not adversley affected by the road shock that it must bear as it rides on the axle.

Mounting of the power steering unit on the axle appears simple at first blush, but is complicated by the very high reaction forces that must be accommodated as the power steering gear operates. Another important consideration is the need for mounting of the unit on the truck so as to be orientated approximately the same as before. This minimizes other changes in engineering of the vehicle for obvious economic benefits. Also, for several years, every available cubic inch of space in and around the power plant compartment has been utilized for auxiliary equipment. Moving the steering gear down adjacent the axle frees premium space above and makes service of all components easier.

A natural location for an axle mounted power steering gear unit is adjacent the spring on the side of the vehicle where the operator is located. If a dual system is employed, the slave or second unit is simply mounted in the same relative location on the opposite side of the vehicle. One reason this is an ideal location is that the axle is reinforced at the place where the spring connects. In other words, a mounting pad is already provided to accommodate the spring. Mounting the power steering unit on a bracket sandwiched between the spring pad and the spring has been found to be highly advantageous.

With the selection of the ideal location, the main problem left to be solved, as indicated above, is how the bracket is to be securely locked in position on the pad to resist the powerful reaction forces of the steering unit. Early attempts have included making a special casting for the power steering unit with the locking lip or tongue on the casting. A special upper spring mounting block is provided with a cooperating grooved extension mating with the tongue on the casting. Thus, the previous design concept was to have a tongue and groove connection above the spring. The draw back of this design is that substantial reaction forces must thus be resisted by the conventional U-bolt clamps that hold the mounting block and extend around the spring leaves and down through the mounting pad on the axle.

Basically, the special tongue and groove connection transmits the reaction forces through to the U-bolts that must then provide the full resistance of the steering unit.

Especially in large vehicles, such as heavy trucks, the previous concept has thus proven to leave much to be desired. The length of each leg of the U-bolt from the special upper spring block to the pad is substantial since the spring leaves pass between them. These U-bolts, because of the lever arm effect, are thus subject to twisting as the gear operates. Especially, over an extended period of operation, the U-bolts bend and elongate. Eventually, due to fatigue, looseness may develop and failure of the mounting inevitably follows.

OBJECTIVES OF THE INVENTION

It is thus one object of the present invention to provide an axle mounting system for a power steering unit that overcomes the prior objections mentioned.

It is another object of the present invention to provide a bracket assembly for axle mounting of a power steering gear unit that is safe and does not rely on the U-bolts of the spring for resisting the reaction forces.

It is still another object of the present invention to provide an axle bracket for power steering unit wherein the reaction forces are transmitted directly from a mounting plate to the axle.

It is another object of the present invention to provide an axle mounting bracket for a power steering gear where minimal modification for adaptation to standard axles is required.

BRIEF DESCRIPTION OF THE INVENTION

The present invention is built around the concept of a mounting bracket for a power steering unit having locating means and locking means directly cooperating with the axle. In this way, the forces of reaction of the power steering unit during operation are directly and positively accommodated, and thereby both maximum efficiency and minimum expense are attained.

The bracket assembly for mounting of the power steering gear unit comprises a base plate, an elongated bearing housing integral with the base plate through which the output shaft of the power steering unit passes and is held, at least one locating pin means, locking means extending between the plate and the axle and clamp means for holding the plate to the axle. Preferably, the pin means takes the place of the conventional locating pin, but now has a locational interference fit, whereas before the fit has been a loose one. And preferably, the locking means takes the form of a plurality of set screws extending through front and rear depending skirts on the base plate and lockingly engaging the axle. The reaction forces of the power steering gear unit are transmitted directly through the locating pin and the locking set screws to the axle.

In an alternative embodiment, additional pins may be provided as the locking means. In the alternative embodiment shown, four additional dowel pins with the same locational interference fit are provided in an array around the central locating pin.

U-bolts in both embodiments are not relied upon to resist the reaction forces, but to merely hold and clamp the spring leaves in position.

In the preferred embodiment with the set screws, all that need be done to adapt with the standard axle to the axle mounting concept of the invention is to ream the existing locating aperture for the larger locating pin. This pin is provided large enough to have an interference fit with the pad. Of course, an interference fit is provided with the aperture in the base plate also. The set screws are individually adjusted so as to precisely align the power steering unit, as may be required to couple to the steering shaft of the vehicle. The single locating pin resists all lateral movement and the set screws, once locked into position by lock nuts, resist any pivoting action about the center locating pin. The auxiliary dowel pins in the alternative embodiment replace the adjustable set screws.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DESCRIPTION OF THE DRAWINGS

FIG. 2 is a rear view of the left end of a typical axle showing the power steering unit mounted by the bracket assembly of FIG. 1 and showing the relative location adjacent the front wheel mounting;

FIG. 7 is partial cross sectional view taken along lines 7—7 showing in part the parts removed from FIG. 6 and clarifying and completing the alternative embodiment showing.

DETAILED DESCRIPTION OF THE PREFERRED EMBODIMENT

Figure 1:
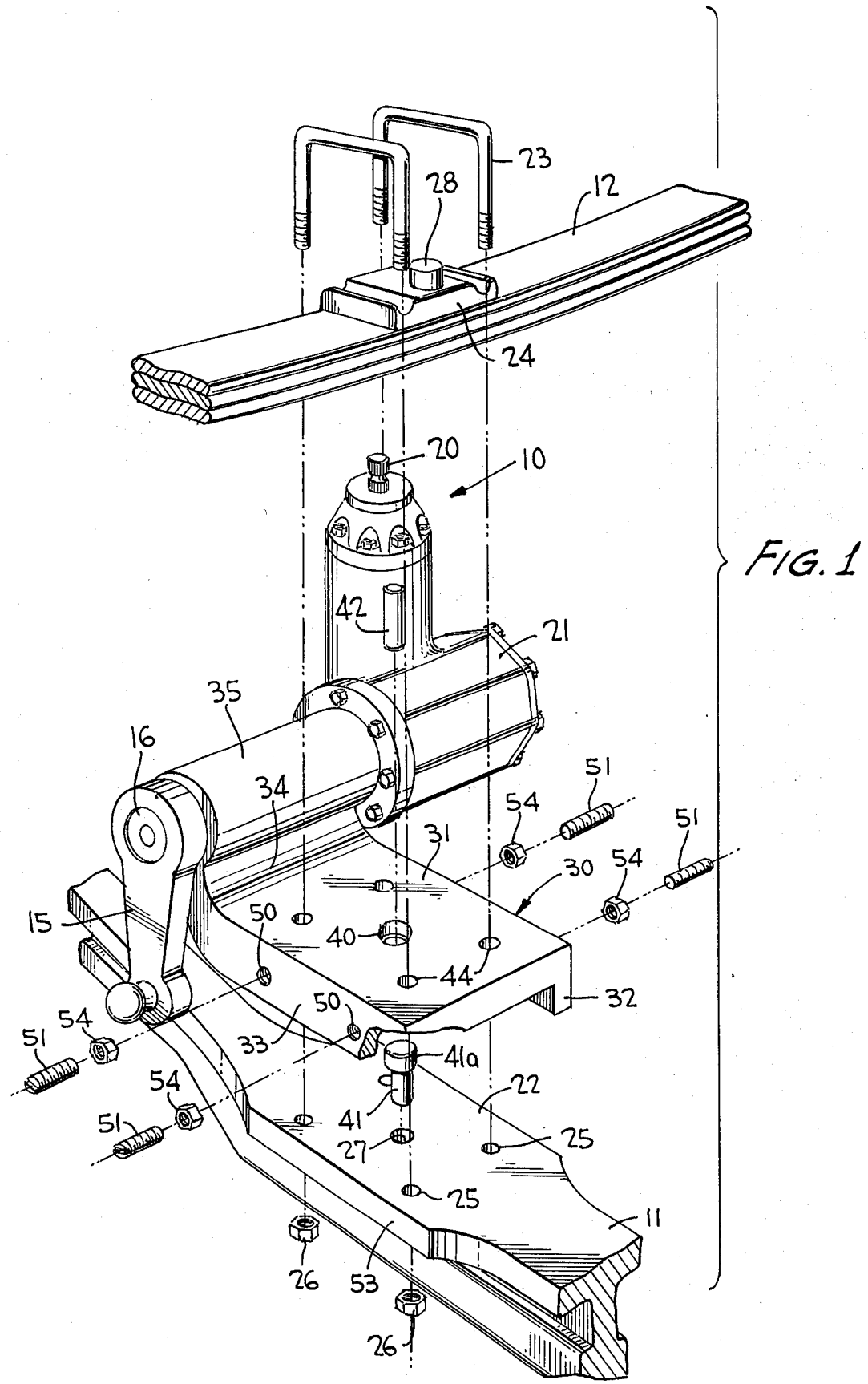
FIG. 1 is an exploded perspective view showing the bracket assembly of the present invention along with the associated spring and axle of the vehicle.

Turning to describe the specific structure of a preferred embodiment, reference should be first made to the composite exploded view of FIG. 1 taken with the assembled view of FIG. 2. An integral power steering gear unit, generally designated by the reference numeral 10, is mounted on a typical heavy-duty truck, or other vehicle with single front axle 11 having a leaf spring 12 on each side (one shown). The relative positioning of the gear unit 10 with respect to the left end of the axle is illustrated by the views looking in from the rear of the axle.

The power steering unit 10 has an output crank 15 mounted on the end of an output shaft 16. Connected to the crank 15 is a drag link 17 (only partially shown in FIG. 2) which extends parallel to the axle. Connecting rod 18 is connected to the linkage at the right wheel (not shown) and transmits the steering force to the wheel mounting means 19 on the left side (see FIG. 2).

The housing for the piston of the power steering unit 10 extends substantially in a vertical direction in the installation incorporating the present invention (see both FIGS. 1 and 2). The input shaft 20 of the unit 10 is at the top. An extensible and flexible coupling (not shown) is understood to be connected to the input shaft 20 for transferring force from the steering shaft of the vehicle.

The power steering gear unit 10 itself, including the output gear housing 21 may be of the same design as presently used in trucks where the unit is mounted on the frame of the truck. However, as will be recognized, and for an important reason set forth below, the output shaft 16 of the unit 10 is considerably longer than the output shaft of a frame-mounted unit.

The axle 11 preferably has an enlarged mounting pad 22 in the area adjacent the end of the axle. The basic purpose for the pad 22 is to provide a mounting location for the leaf springs 12. Since the weight of a truck is resting on the springs 12, the pad 22 is basically receiving a weight bearing load. As is well-known, U-bolts 23 are adapted to engage a spring block 24 on top of the springs 12 and clamp the parts together.

The U-bolts clamps 23 pass through the apertures 25 in the pad 22 with a loose fastener fit and are fastened by the nuts 26. All the U-bolts 23 are intended to accomplish is to make sure the spring stays centered on the pad 22 and is clamped down. There is no critical locating function associated with the U-bolts 23. The upward force of the truck body against the U-bolts 23 acting through the spring 12 is limited to relatively minor upward momentum and centrifugal forces as the truck moves over bumps and around curves.

A single locating aperture 27 is already formed in the standard axle 11 at pad 22. This is normally used to allow the springs 12 to be located with respect to the pad during assembly. In a typical prior art arrangement the locating pin has a loose fit, the same fit as the U-bolts 23. As will be described, this same aperture is advantageously used in my invention. It is converted to a part of positive, tight fitting means. It is so converted by merely reaming it out so as to receive a larger pin.

A bumper 28 is provided on the top of the spring block 24 for absorbing the shock in the event that the vehicle load causes the spring 12 to bottom out.

With the above basic structure in mind, one skilled in the art will now recognize my novel mounting bracket 30 for the integral power steering unit 10. The bracket 30 includes a base or mounting plate 31 with front and rear depending skirt portions 32, 33, respectively. The plate 31 has a curved connecting portion 34. This, in turn, supports the integral elongated bearing housing 35, through which the output shaft 16 passes.

Figure 5:
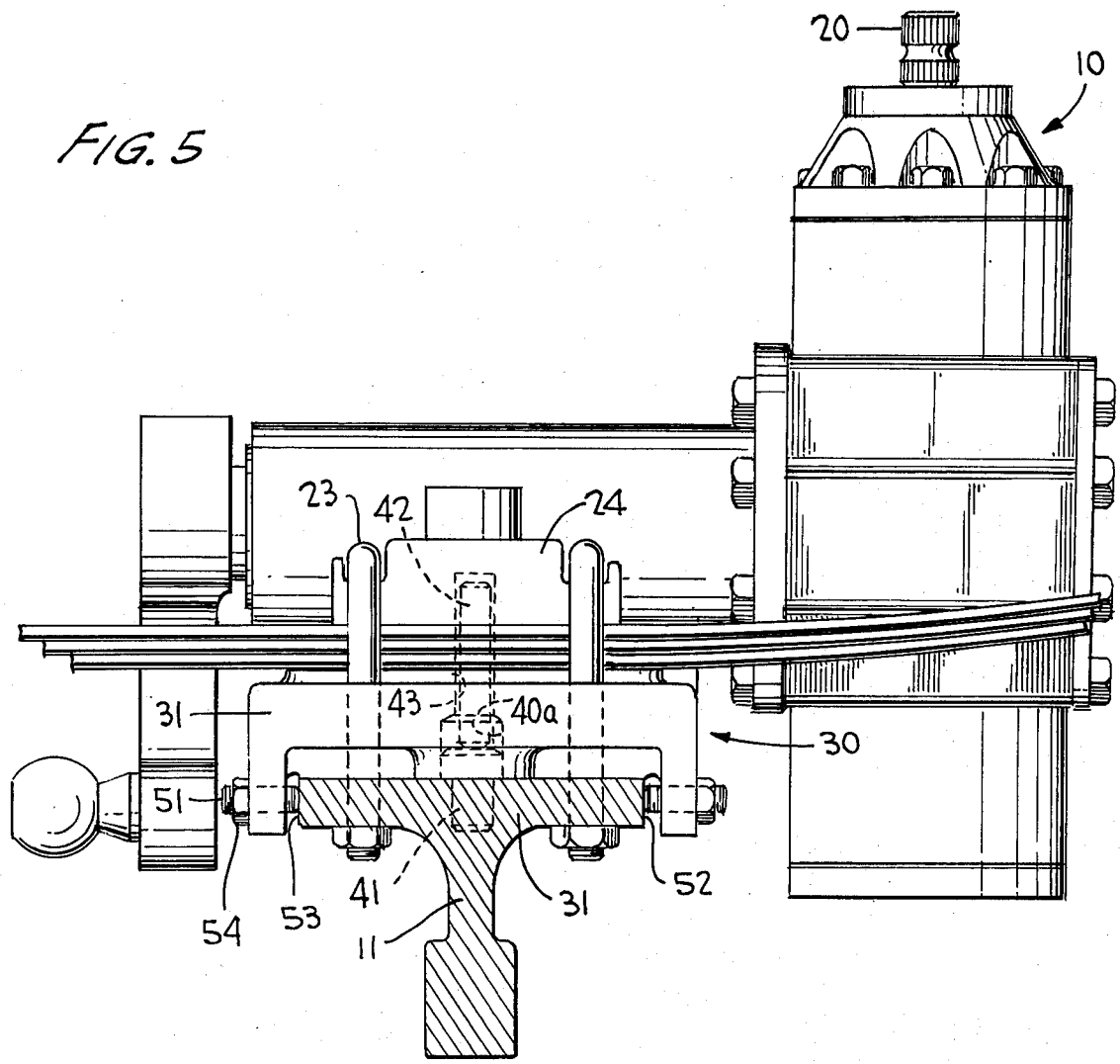
FIG. 5 is a full side view of the bracket assembly and associated power steering gear unit showing the preferred embodiment locking means, and taken along line 5—5 of FIG. 3.

Located centrally in the mounting plate 31 is a stepped locating aperture 40 aligned with the central aperture 27 on the mounting pad 22. As best shown in FIG. 5 (cf. FIG. 7), the underneath side of the aperture 40 is an enlarged portion 40a. A special locating pin 41 with an enlarged head 41a is inserted from underneath into the aperture 40a. These parts have a locational interference fit with each other. The shank of the pin mates with the aperture 27 in the pad 22, also with a locational interference fit, as will be fully described below. A second locating pin 42 is positioned within the upper portion of locating aperture 40 and extends with a loose fit through the locating hole 43 (FIG. 5, cf. FIG. 7). This pin 42 merely aids in assembly, and prevents excessive sidewise movement of the individual leafs of the spring 12.

Figure 4:
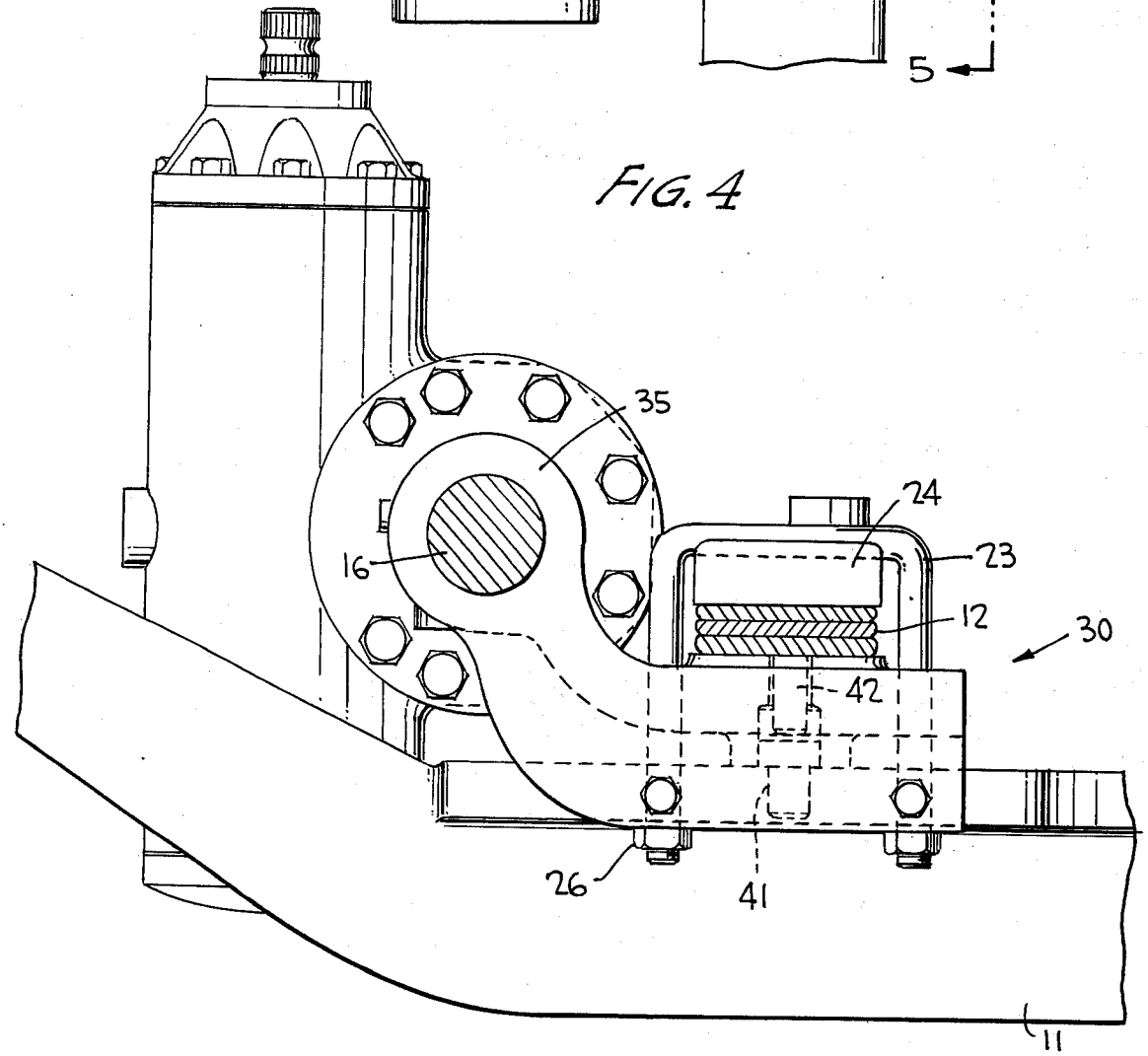
FIG. 4 is a cross sectional view looking in from the side of FIG. 3 along line 4—4.

The locating pin 41 must have a shank or body that is especially machined to have the specific tight fit in the reamed aperture 27 of the axle (note FIGS. 5 and 7). The locational interference fit has been selected to assure that the bracket 30 is rigidly located on the pad 22 once the assembly is made (see FIGS. 4 and 5).

The fit described is well known to a machinist and may be therefore easily translated into actual additional description and for incorporation by reference herein, reference is made to Machinery's Handbook by Erik Oberg and Franklin D. Jones, 19th edition, 2nd printing, 1971, published by Industrial Press, Inc., New York, New York; page 1519 et seq.

From the foregoing, it can now be seen that the power steering gear unit 10 is located and positively held from lateral shifting movement on the pad 22. The pin 41 very simply holds the plate 31 against any pure sidewise shifting movement that would be caused by the reaction forces of the unit 10 during operation.

The pin 41 is hardened steel and has a shear modulus high enough to hold the parts rigidly together. The size of the pin 41 and the corresponding holes 27, 40 is of course calculated in each instance to correspond to the size of the power steering gear unit 10.

The U-bolt clamps 23 extend through the apertures 44 in the plate 31 with a loose fastener fit to assure case of assembly of these parts. As mentioned above, the legs of the U-bolts 23 do not have to be relied upon to assist in any way in the accommodation of the forces of reaction of the unit 10. Instead, according to my invention, additional locking means is provided to hold the bracket 30 against pivoting movement about the single locating pin 41, and the preferred embodiment of this locking means will now be described.

In FIGS. 1 and 5 spaced tapped openings 50 are provided on the depending skirt portions 32, 33. Set screws 51 mate with the tapped openings 50 and the inner ends of the screws cooperate with the front and rear edges 52, 53 (see FIG. 5). Lock nuts 54 are utilized to maintain the set screws in position in the final adjusted position.

It is of advantage that the set screws 51 are individually adjustable. This means that during assembly, just the right alignment of the bracket 30 may be attained.

Further, no special machining of the front and rear edges 52, 53 is required since any difference in the edges is merely adjusted out. As the set screws are adjusted (see FIG. 5), the bracket 31 is pivoted about the locating pin 41 until just the right position is attained. With this adjustment, the right position for the input shaft 20 is easily provided. Finally, the lock nuts 54 are drawn down and the assembly is complete.

Figure 3:
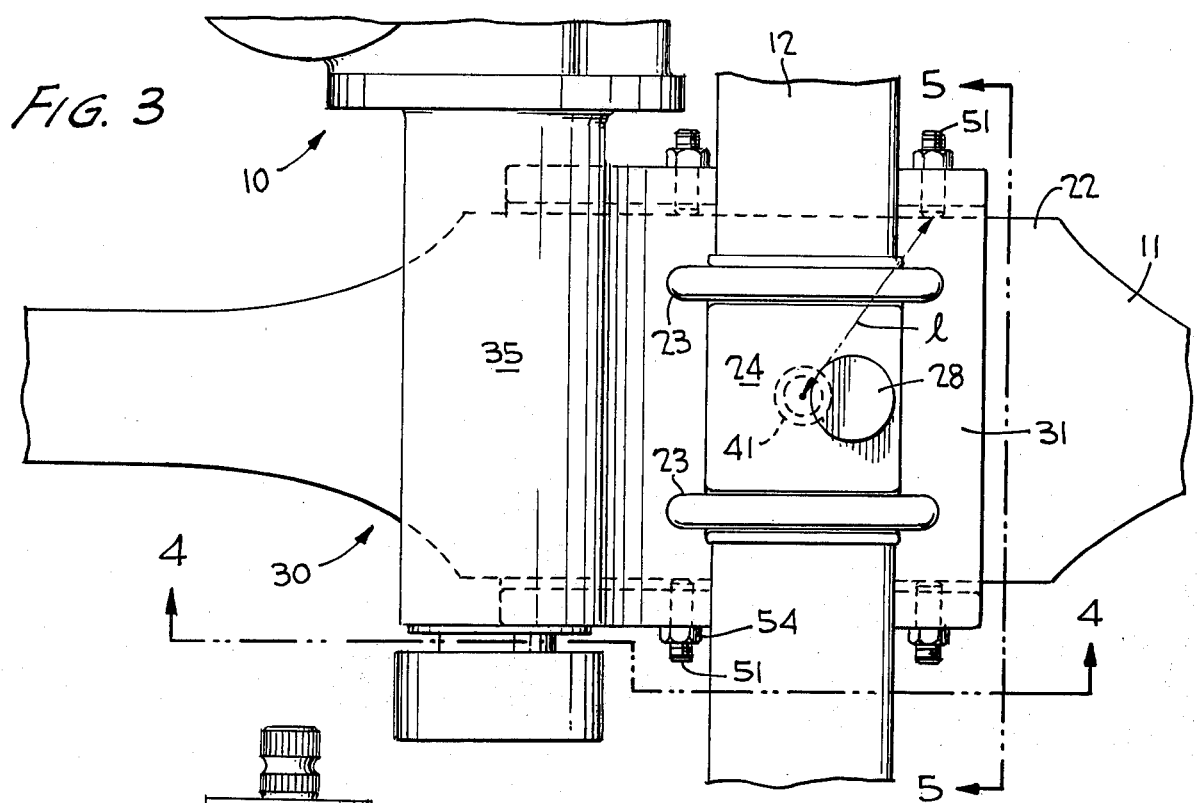
FIG. 3 is a top plan view of the bracket assembly mounted on the axle.

It will be realized that the set screws 51 are particularly effective in preventing pivoting or skewing action of the bracket 30 about the center locating pin 41. As best shown in FIG. 3, the bearing end of the set screws 51 is at a substantial lever arm L from the center of the pin 41 making the powerful reaction forces of the power steering gear unit relatively easy to resist without undue strain on the parts. As shown in this FIG. 3, the lever arm L is effective for each set screw 51. Thus, the pin 41 resists any lateral shifting action of the bracket 30, and the set screws 51 resist any pivoting action about the center point of the pin 41, whereby the unit 10 is securely held and locked in position in a most efficient and relatively inexpensive manner.

Particular note should be made that the upper spring block 24 and the U-bolt clamps 23 are not required to perform any resisting function and thus can be standard parts previously used.

Figure 6:
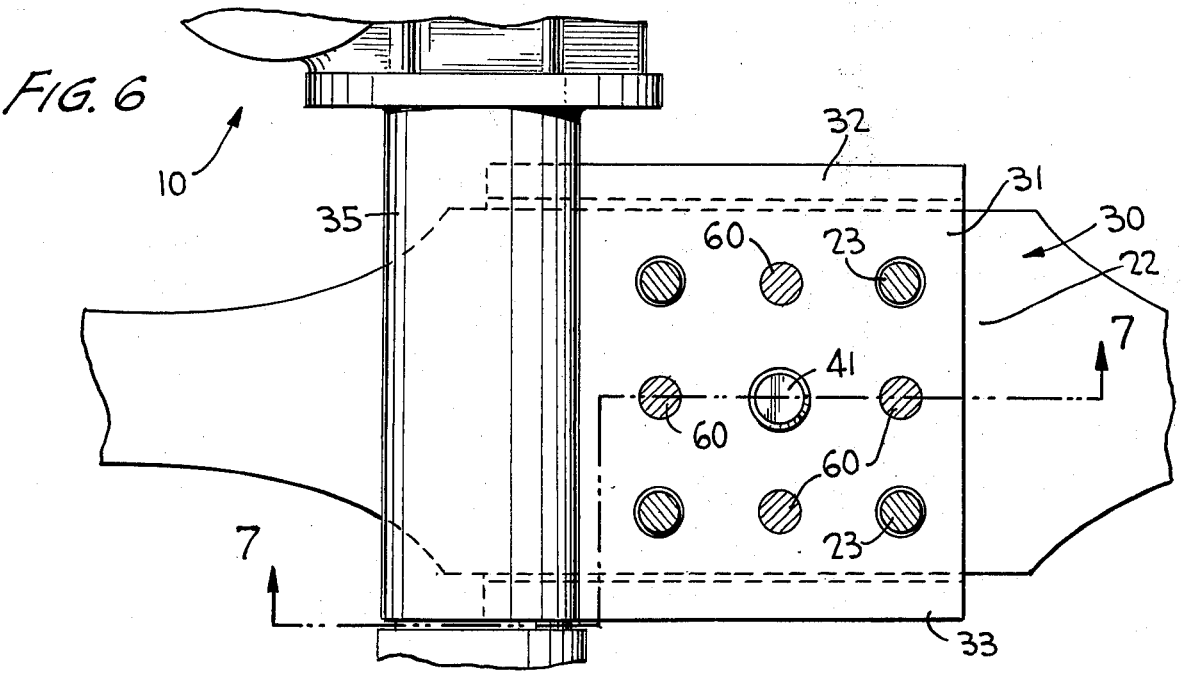
FIG. 6 is a showing of the alternative embodiment of the present invention with parts removed and other parts in cross section for clarity.

An alternative embodiment of the bracket assembly is shown in FIGS. 6 and 7 of the drawings. In these figures, like reference numerals have been applied to the same parts. The mounting bracket 30 comprises the same plate 31 and may have front and rear depending skirts 32, 33. The bracket has integrally formed thereon the elongated bearing housing 35 for mounting of the gear unit 10.

The differences in the bracket assembly of this embodiment is that the set screws 51 have been replaced with dowel pins 60 extending between the base plate 31 and the mounting pad 22. These dowel pins 60 have the same locational interference fit as the main locating pin 41. No shifting movement of the plate 31 on the pad 22 is allowed. As explained above, the U-bolt clamps 23 (see FIG. 6) and the upper locating pin 42 for the spring and spring block 24 have a loose or fastener clearance fit.

Thus, with the array of locator dowel pins 60 and the main locating pin 41, side movement, as well as rotational movement of the bracket 31 is positively resisted. The advantage of this embodiment is that the dowel pins 60 are effective to resist all lateral movement as well as the pivotal movement about the center locating pin 41.

For this embodiment, the holes 61 (see FIG. 7) extending through the plate 31 and the pad 22 of the axle 11 are drilled after the plate 31 has been positioned on the pad 22 with main locating pin 41 in position. The dowel pins 60 are then driven home into their locked position, as shown in FIG. 7. The frictional engagement of the pins 60 in the holes maintain the parts together during use.

In assembling the bracket 30 on a standard axle 11, all that need be done to the standard axle is to ream the center locating aperture 27 to the requisite size for receipt of the locating pin 41. The size and tolerances of the aperture 27 is gauged such that with the new, larger locating pin 41, the fit is an interference fit. This assures the positve locating and locking objective. If the first embodiment of the bracket 30 is used, the set screws 51 are merely adjusted and the nuts 54 drawn tight to complete the installation. If the alternative embodiment of FIGS. 6 and 7 is used, the holes 61 are drilled and the pins 60 inserted.

In view of the foregoing description, it will now be apparent that the objective of providing an efficient and low cost mounting bracket 30 and bracket assembly has been attained. The positive holding and locking of the bracket 30 against lateral shifting and pivoting or skewing is accomplished without any parts being subject to the stress or strain that has characterized earlier designs. The parts holding the bracket 30 in position are located precisely at the interface where the shifting movement would otherwise occur, rather than being spaced therefrom. This assures that the maximum holding force is utilized. There is no force multiplying distance between the interface and the location of the holding parts that would otherwise allow twisting of the U-bolts that clamp the spring in position.

In the embodiment shown in FIGS. 1–5, the distance L, extending along the interface rather than perpendicular thereto is working for the benefit of the holding force. The use of the plurality of locking means 51 or 60 also assures that each part is maintained well within the stress and shear limits.

In this disclosure, there is shown and described only the preferred embodiments of the invention, but, as aforementioned, it is to be understood that the invention is capable of use in various other combinations and environment and is capable of changes or modifications within the scope of the inventive concept as expressed herein.

What is claimed is:

1. A bracket assembly for axle mounting of a power steering gear unit on a vehicle axle comprising
   a base plate, means connecting said plate to said unit,
   tight fitting pin means locating the base plate on said axle,
   clamp means for holding said plate to said axle, and
   positive locking means extending between said plate and said axle for positively resisting the lateral shifting and rotational reaction forces of said unit during operation.

2. The bracket assembly of claim 1 wherein said pin means has a locational interference fit with said base plate and said axle.

3. The bracket assembly defined in claim 1 wherein said locking means comprises a plurality of adjustable set screws mounted in said base plate and bearing against said axle.

4. The bracket assembly defined in claim 3 wherein said base plate is provided with a depending skirt extending along the front and rear of said base plate, said set screws extending through the skirts and bearing against the front and rear edges of said axle.

5. The bracket assembly of claim 4 wherein said axle comprises a substantially flat, enlarged support pad and a spring mounted on said support pad, said base plate is positioned on the support pad for said spring of the vehicle, said set screws cooperating with the front and rear edges of said pad.

6. The bracket assembly of claim 2 wherein said locking means comprises a plurality of dowel pins extending through said base plate and said axle and having a locational interference fit with the same.

7. The bracket assembly of claim 6 wherein said dowel pins comprise an array of pins around said pin means.

8. The bracket assembly of claim 7 wherein said clamp means comprises U-bolts extending through said base plate and said axle, the legs of said U-bolts being positioned between said dowel pins.

9. The bracket assembly of claim 1 wherein the axle is provided with a substantially flat, enlarged spring mounting pad, said pin means extending through said pad, and said locking means cooperating with the edges of said pad.

10. The bracket assembly of claim 1 wherein said positive locking means comprises adjustable means between said plate and said axle.

11. A bracket for axle mounting of a power steering gear unit on a vehicle axle comprising a base plate, an aperture extending through said base plate for receiving a locating pin, depending skirt portions extending along two edges of said base plate, positive locking means on said base plate and said skirt portions to cooperate with said axle for positively resisting the lateral shifting and rotational reaction forces of said unit during operation.

12. The bracket of claim 11 wherein said locking means comprises a plurality of adjustable set screws extending through openings in said skirt portions.

13. The bracket of claim 11 wherein as further provided a curved portion of said base plate, and an elongated bearing housing connected to said curved portion for receiving the output shaft of said power steering gear unit.

14. The bracket assembly of claim 11 wherein said positive locking means further comprises the sides of said aperture adapted to cooperate with the locating pin, whereby to resist lateral shifting.

* * * * *